(No Model.) 2 Sheets—Sheet 1.
T. KIRSHMAN & L. M. MEDLIN.
BALING PRESS.
No. 600,791. Patented Mar. 15, 1898.
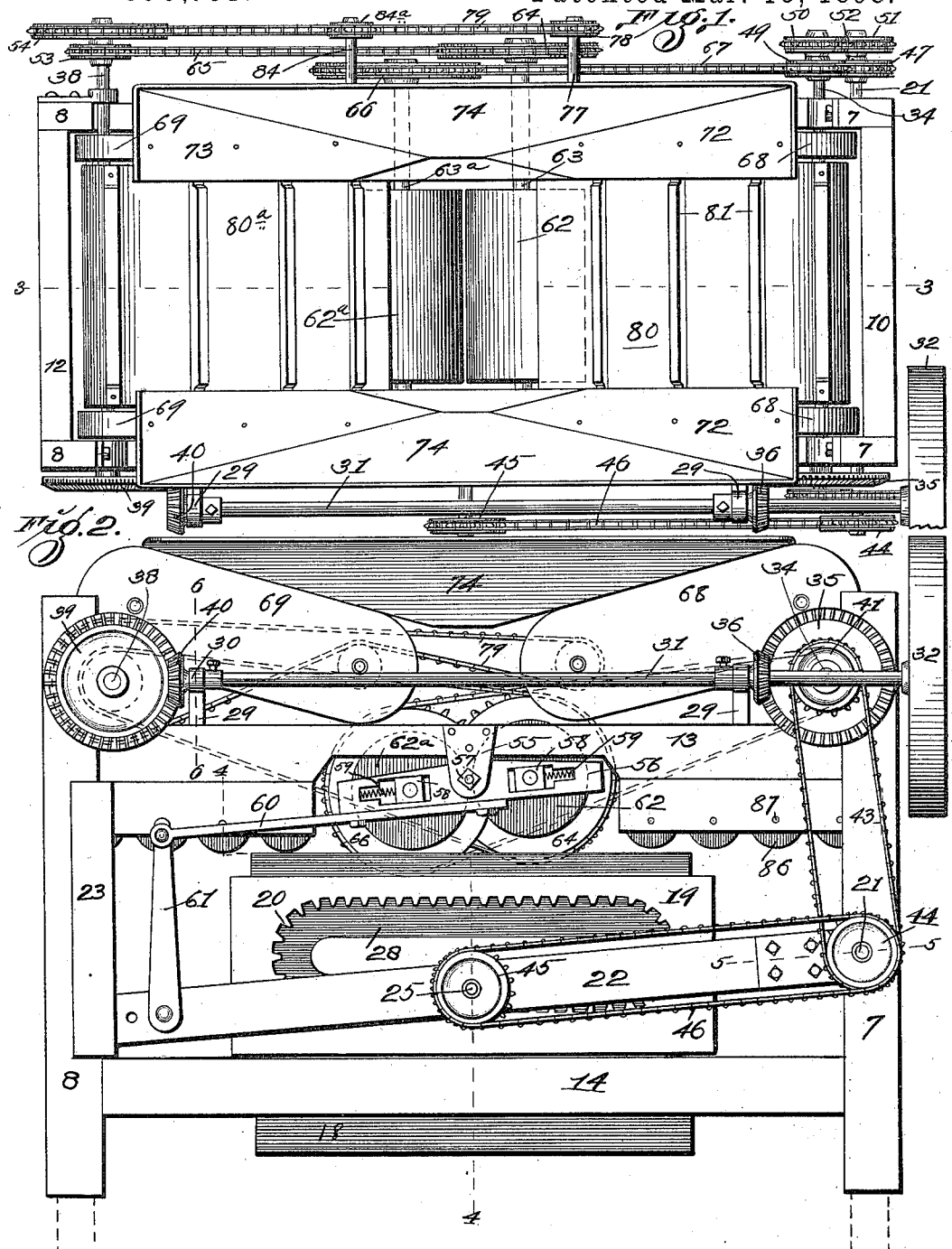
Attest:
N. P. Smith
S. G. Wells
Inventors:
Thomas Kirshman and
Logan M. Medlin.
By Higdon, Longan & Higdon, Attys.

(No Model.) 2 Sheets—Sheet 2.
T. KIRSHMAN & L. M. MEDLIN.
BALING PRESS.
No. 600,791. Patented Mar. 15, 1898.
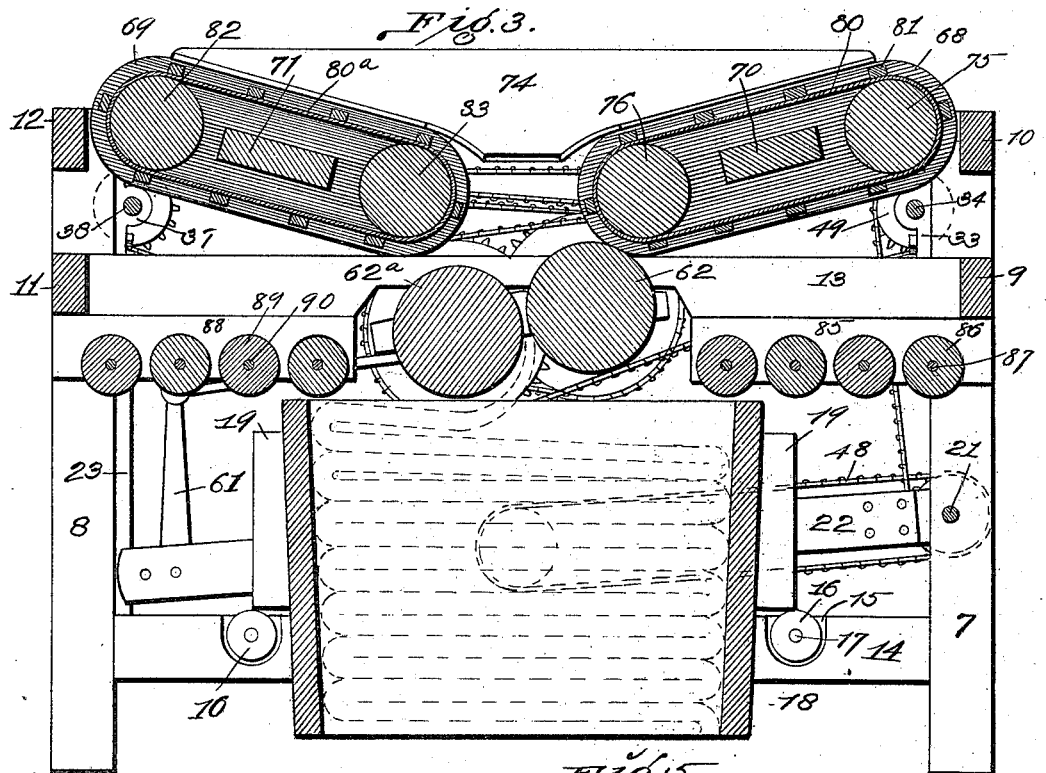
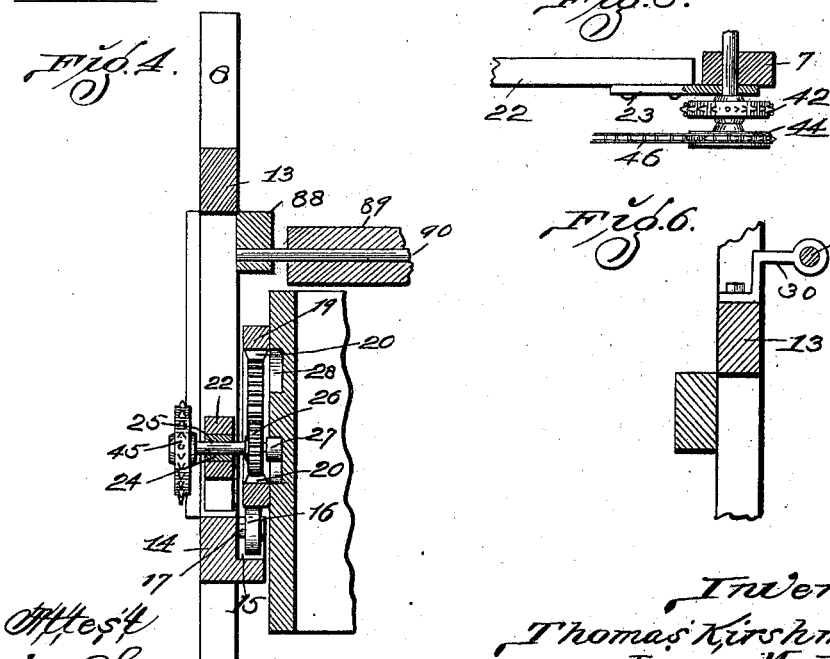
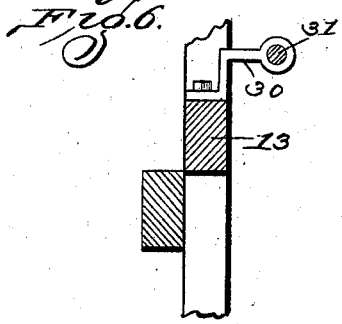
Inventors:—
Thomas Kirshman and
Logan M. Medlin.
By Higdon, Longan Higdon
Atty's.
Attest
M. Smith
S. G. Wells.

UNITED STATES PATENT OFFICE.

THOMAS KIRSHMAN, OF CALIFORNIA, AND LOGAN M. MEDLIN, OF LATHAM, MISSOURI.

BALING-PRESS.

SPECIFICATION forming part of Letters Patent No. 600,791, dated March 15, 1898.

Application filed April 19, 1897. Serial No. 632,795. (No model.)

*To all whom it may concern:*

Be it known that we, THOMAS KIRSHMAN, of the city of California, and LOGAN M. MEDLIN, of the city of Latham, Moniteau county, State of Missouri, have invented certain new and useful Improvements in Baling-Machines, of which the following is a full, clear, and exact description, reference being had to the accompanying drawings, forming a part thereof.

Our invention relates to baling-machines; and it consists of the novel construction, combination, and arrangement of parts hereinafter shown, described, and claimed.

Figure 1 is a top plan view. Fig. 2 is a front elevation. Fig. 3 is a vertical sectional view taken on a line parallel with the front elevation and approximately on the line 3 3 of Fig. 1. Fig. 4 is a vertical transverse sectional view taken approximately on the line 4 4 of Fig. 2, parts being broken away to economize space. Fig. 5 is a horizontal sectional view taken approximately on the line 5 5 of Fig. 2, parts being broken away. Fig. 6 is a vertical sectional view taken approximately on the line 6 6 of Fig. 2, parts being broken away.

In the construction of a baling-machine in accordance with the principles of our invention the posts 7 support the right-hand end of the machine and the posts 8 support the left-hand end. There are two of the posts 7 and two of the posts 8, and they are arranged in vertical position in the form of a rectangle and rest upon a suitable foundation some distance above the ground or floor. The upper ends of the posts 7 are connected by the cross-pieces 9 and 10, and the upper ends of the posts 8 are connected by the cross-pieces 11 and 12. The cross-pieces 9 and 11 are connected by the side pieces 13, thus forming connections between the upper ends of corresponding ones of the posts 7 and 8. The lower ends of the posts 7 are connected to the lower ends of corresponding ones of the posts 8 by means of the side pieces 14. The recesses 15 are formed upon the inner faces of the side pieces 14, and the rollers 16 are placed in said recesses and mounted upon the pins 17, fixed in said side pieces, said rollers being mounted in position to extend slightly above the upper edges of said side pieces 14. There are four or more of the rollers 16 for each one of the side pieces 14, distributed suitable distances apart and from end to end of said side pieces.

The baling-box 18 is square or rectangular in plan, is open at its top and bottom, and is of such a size that it fits between the side pieces 14. The baling-box 18 consists of the front wall, a back wall, and two end walls arranged in vertical positions and rigidly secured together. The lower end of the box may be slightly contracted, as required, to cause the hay or straw to choke in the box and resist the pressure of the press, as required, to press the bale tight before pushing it out of the box.

The racks 19 are secured in position, one against the outer surface of the back wall of of the baling-box and the other against the outer surface of the front wall of the baling-box, said racks being mounted in horizontal and transverse alinement, with their lower edges resting upon the rollers 16, thus forming a support for the baling-box. Oblong openings are formed through the racks 19, and the gear-teeth 20 are formed around said openings.

A shaft 21 is mounted in bearings through the posts 7, said shaft extending entirely across the machine and projecting some distance outside of the posts. The walking-beams 22 are placed in position above the side pieces 14 and in positions parallel with each other. The plates 23 are attached to the right-hand ends of said walking-beams, said plates extending outwardly from the ends of the beams against the outer faces of the posts 7, and the shaft 21 extends through bearings in said plates, as required, to form hinged connections between the walking-beams 22 and the posts 7. The opposite ends of the walking-beams 22 from the shaft 21 are intended to vibrate up and down in vertical alinement with and above the side pieces 14, and said walking-beams extend nearly to the posts 8.

Cleats 23 are attached in positions against the front and rear faces, respectively, of the posts 8, said cleats extending a short distance to the right from said posts and forming guides to keep the free ends of the walking-beams 22 in vertical alinement with the side pieces 14. Bearings 24 are mounted horizontally through the centers of the walking-beams 22 and in alinement with each other, and the shafts 25 are mounted in said bearings. Upon the inner ends of the shafts 25 are spur-gears 26, which engage the teeth 20 upon the racks 19. Upon the extreme inner ends of the shafts 25 and inside of the spur-gears 26 are small rollers 27, and recesses 28 are formed in the outer faces of the front and rear walls of the baling-box, said recesses following the lines inside of and parallel with the rack and said rollers 27 operating in said recesses as required to hold the teeth of the spur-gear 26 in engagement with the teeth 20 of the racks 19.

Arms 29 extend upwardly and outwardly from the front one of the side pieces 13, and longitudinally and horizontally alined bearings 30 are formed in the upper ends of said arms 29, and the drive-shaft 31 is mounted in said bearings 30. A belt-wheel 32 is fixed upon the right-hand end of the drive-shaft 31, and said belt-wheel 32 is connected to the source of motive power by means of a suitable belt in the usual way, said belt-wheel rotating in the direction indicated by the arrow.

Bearings 33 are fixed to the inner faces of the posts 7 above the side pieces 13 and in transverse alinement with each other, and the shaft 34 is mounted in said bearings 33. Upon the front end of the shaft 34 is a large bevel-gear 35, and upon the drive-shaft 31 is a small bevel-gear 36, which meshes with the bevel-gear 35 and drives the shaft 34. The bearings 37 are fixed to the inner faces of the posts 8 above the cross-pieces 13 and in transverse alinement with each other, and the shaft 38 is mounted in said bearings 37. A bevel-gear 39, corresponding to the bevel-gear 35, is fixed upon the shaft 38, and the small bevel-gear 40, the reverse of the bevel-gear 36, is fixed upon the drive-shaft 31 and meshes with the bevel-gear 39 and drives the shaft 38 in a direction opposite to the direction of the shaft 34. Upon the front end of the shaft 34 and in front of the bevel-gear 35 is a sprocket-wheel 41, and upon the front end of the shaft 21 is a sprocket-wheel 42, said sprocket-wheels 41 and 42 being connected by the chain 43. Upon the front end of the shaft 21 and in front of the sprocket-wheel 42 is a sprocket-wheel 44, and upon the outer ends of each of the shafts 25 are fixed the sprocket-wheels 45, the front one of which is in alinement with the sprocket-wheels 44 and connected to said sprocket-wheel 44 by means of the chain 46. Upon the rear end of the shaft 21 is a sprocket-wheel 47, which is connected to the rear one of the sprocket-wheels 45 by means of the chain 48. Upon the rear end of the shaft 34 is a sprocket-wheel 49, and upon the shaft 34 behind the sprocket-wheel 49 is a second sprocket-wheel 50. Upon the extreme rear end of the shaft 21 and behind the sprocket-wheel 47 is a second sprocket-wheel 51, and a chain 52 connects the sprocket-wheels 50 and 51. The chains 43 and 52 form double connections between the shafts 21 and 34.

Upon the rear end of the shaft 38 is a small sprocket-wheel 53, and behind the sprocket-wheel 53 is a larger sprocket-wheel 54.

Attached to the outer faces of and depending from the centers of the side pieces 13 are brackets 55, said brackets being in alinement with each other, one upon each of the side pieces. A walking-beam 56 is pivotally attached to each one of the brackets 55 by means of a bolt 57, passing through the lower end of the bracket 55 and through the center of the walking-beam 56. A bearing 58 is slidingly mounted in each end of the walking-beams 56, said bearings being mounted to slide horizontally, and springs 59 are placed against the outer sides of said bearings as required to press said bearings toward each other. An arm 60 is attached to each of the walking-beams 56 and extends toward and nearly to the posts 8, and the connecting-rod 61 connects the free ends of the arms 60 with the free ends of the walking-beams 22.

The feed-rollers 62 and 62$^a$ are mounted in parallel positions transversely of the machine, and their spindles 63 and 63$^a$ are mounted in the bearings 58. Upon the rear end of the spindle 63 is a large sprocket-wheel 64, and a chain 65 connects the sprocket-wheel 64 with the sprocket-wheel 53. Upon the rear end of the spindle 63$^a$ is a sprocket-wheel 66, corresponding to the sprocket-wheel 64, and a chain 67 connects the sprocket-wheel 66 with the sprocket-wheel 49.

A hopper is mounted in position to feed hay and straw downwardly between the feed-rollers 62 and 62$^a$. The hopper consists of the pair of oblong side pieces 68 and a corresponding pair of oblong side pieces 69. The side pieces 68 are mounted on edge in parallel inclined positions, the inner ends of the side pieces resting upon the side pieces 13, directly above the roller 62, and the outer ends of said side pieces 68 being positioned directly inside of the cross-piece 10. The side pieces 69 are inclined in opposite directions from the side pieces 68, with their inner ends resting upon the side pieces 13 and above the roller 62$^a$ and with their outer ends directly inside of the cross-piece 12. The side pieces 68 are connected by the cross-piece 70, inserted with its ends against the inner faces of said side pieces and approximately at their centers, and the side pieces 69 are connected by the cross-piece 71 in the same manner. The feed-boards 72 are fixed to the upper edges of the side pieces 68, and the feed-boards 73 are fixed to the upper edges of the side pieces 69. The feed-boards 72 and 73 are substantially triangular and are mounted with their inner edges projecting a short distance inwardly from the side pieces 68 and 69 and in a straight line, as shown in Fig. 1. The outer edges of the corresponding ones of the feed-boards 72 and 73 are rigidly connected by the side boards 74. A roller 75 is mounted between the outer ends of the side pieces 68, with its spindle operating in bearings formed in or extending through said side pieces. The roller 76 is mounted between the inner ends of the side pieces 68, and its shaft 77 extends backwardly through the back one of the side pieces 68 and carries the sprocket-wheel 78 upon its rear end. The chain 79 connects the sprocket-wheel 78 with the sprocket-wheel 54.

The carrier or apron 80 connects the rollers 75 and 76, the cleats 81 of said carrier being of such a length that they will operate between the edges of the feed-boards 72. The roller 82 is mounted between the outer ends of the side pieces 69, and a roller 83 is mounted between the inner ends of said side pieces, and the shaft 84 of said roller 83 extends backwardly through the back one of the side pieces 69, and a sprocket-wheel $84^a$ is fixed upon the rear end of said shaft in position to be engaged by the chain 79, said chain running above said sprocket-wheel and then under the sprocket-wheel 78 as required to operate the rollers 76 and 73 in opposite directions. A carrier $80^a$, which corresponds to the carrier 80, connects the rollers 82 and 83.

The blocks 85 are mounted under the right-hand ends of the side pieces 13 and attached to the inner faces of the posts 7, said blocks extending nearly to the roller 62 and the inner ends of said blocks being secured in position in any suitable manner. The rollers 86 are mounted transversely of the machine or in lines parallel with the roller 62, and the spindles 87 of said rollers 86 operate in bearings in said blocks 85. The blocks 88, corresponding to the blocks 85, are mounted under the left-hand ends of the side pieces 13 with their outer ends attached to the inner faces of the posts 8, and said blocks extend inwardly nearly to the roller $62^a$ and their inner ends are secured rigidly in position in any suitable manner. The rollers 89 are mounted between the blocks 88, and their spindles 90 operate in bearings in said blocks 88. The rollers 86 and 89 are mounted in horizontal alinement, the lower points of said rollers being slightly below the lower points of the rollers 62 and $62^a$ when said rollers 62 and $62^a$ are in horizontal alinement, and the lower points of the rollers 86 and 89 are slightly above or upon the upper edges of the side walls of the baling-box 18.

In the practical operation of our improved baling-machine power is applied to the belt-wheel 32 to rotate said belt-wheel in the direction indicated by the arrow. The operation of the spur-gears 26 through their connections with the belt-wheel 32 reciprocates the baling-box. The gears 26 travel around the rack upon the teeth 20, and in so doing the free ends of the walking-beams 22 are vibrated up and down, and the operation of the walking-beams 22 operates the arms 60 to rock or vibrate the walking-beams 56. The hay or straw or other material to be baled is dumped into the hopper in any suitable way. The carriers 80 and $80^a$ operate to carry the hay or straw to the center of the hopper, from whence it falls down between the feed-rollers 62 and $62^a$ and is compressed in passing between said rollers and then passes downwardly into the baling-box 18 in a substantially endless web, and as the baling-box 18 is reciprocated the web is deposited in the box in layers—that is, it is folded back and forth upon itself, as indicated in dotted lines in Fig. 3. The lower end of the baling-box may be choked or closed in any suitable way until the box is filled and compressed, after which the bale material will pass downwardly out of the box only as it is pressed downwardly by the action of the feed-rollers 62 and $62^a$ and the rollers 86 and 89.

The directions of movements of the various parts are indicated by the arrows. The operation of the walking-beams 22, operating the walking-beams 56, reciprocates the rollers 62 and $62^a$ up and down in opposite directions. Referring to Fig. 3, when the baling-box is moving to the left the roller $62^a$ is pressing upon the web or layer and the roller 62 is elevated, so as not to engage the portion of the web which has been deposited in the box. When the motion of the box is reversed and it is moving to the right, the roller 62 is lowered and the roller $62^a$ is elevated. Then the roller 62 presses upon the web and the roller $62^a$ is elevated to clear the web, thus preventing buckling of the web after it has been deposited in a horizontal position in the box. As the baling-box passes under the rollers 86 and 89 they simply act as followers to hold the layers of the web of hay or straw in the box as they have been deposited either by the feed-roller 62 or $62^a$. When the bale has reached the desired size, it may be tied in the usual way or in any suitable manner.

One of the important uses of our improved baling-machine is to place it behind a threshing-machine in position to receive the straw in the hopper as the straw comes from the threshing-machine, and then the baling-machine will bale and take care of the straw as it comes from the threshing-machine. It is obvious that the baling-machine may be used for all kinds of material—such as straw, hay, cotton, or the like—and that it may be used independently or in connection with other machines, such as threshing-machines.

Compressing hay, straw, or other material into a substantially endless web and folding the web upon itself and then pressing the layers or folds together produces a very neat, compact, and substantial bale, and at the same time the machine may be run at a comparatively high rate of speed.

We claim—

1. In a baling-machine, a reciprocating baling-box, feed-rollers mounted above said baling-box, said feed-rollers being connected by walking-beams to cause said rollers to vibrate up and down in opposite directions, means of delivering material to said feed-rollers and discharging the material by said feed-rollers into said baling-box in the form of a web and during the reciprocation of the baling-box to fold said web into layers within the baling-box and means of compressing said layers within said baling-box, substantially as specified.

2. In a baling-machine, a reciprocating baling-box open at its top and bottom, feed-rollers mounted above said baling-box, said feed-rollers being connected by walking-beams to cause said rollers to vibrate up and down in opposite directions, means of delivering material to said feed-rollers and discharging the material by said feed-rollers into said baling-box in the form of a web and during the reciprocation of the baling-box to fold said web into layers within the baling-box and means of compressing said layers within said baling-box, substantially as specified.

3. In a baling-machine, walking-beams mounted in parallel positions, bearings mounted in the ends of said walking-beams, feed-rollers mounted between said walking-beams with their spindles operating in said bearings, a baling-box mounted for reciprocation below said feed-rollers, endless racks attached to the sides of said baling-box, walking-beams mounted beside said endless racks and having corresponding ones of their ends pivoted to the frame of the machine, shafts mounted in bearings in said walking-beams, pinions upon said shafts and engaging said racks to reciprocate the baling-box, arms projecting from the walking-beams carrying the feed-rollers, and connecting-rods connecting said arms and the second-mentioned walking-beams to reciprocate the feed-rollers simultaneously with the reciprocation of the baling-box, substantially as specified.

4. In a baling-machine, a reciprocating baling-box open at its top and bottom and contracted at its lower end, feed-rollers mounted above said baling-box, said feed-rollers being connected by walking-beams to cause said rollers to vibrate up and down in opposite directions, means of delivering material to said feed-rollers and discharging the material by said feed-rollers into said baling-box in the form of a web and during the reciprocation of the baling-box to fold said web into layers within the baling-box and means of compressing said layers within said baling-box, substantially as specified.

5. In a baling-machine, a reciprocating baling-box, feed-rollers mounted above said baling-box, said feed-rollers being connected by walking-beams to cause said rollers to vibrate up and down in opposite directions, a hopper mounted above said feed-rollers, endless carriers operating in said hopper to deliver material to said feed-rollers, said material being delivered by said feed-rollers into said baling-box in the form of a web and during the reciprocation of the baling-box to fold said web into layers within the baling-box, and means of compressing said layers within said baling-box, substantially as specified.

In testimony whereof we affix our signatures in presence of two witnesses.

THOMAS KIRSHMAN.
LOGAN M. MEDLIN.

Witnesses:
HENRY HERFURTH,
G. HALDIMAN.